(12) United States Patent
Miyazaki et al.

(10) Patent No.: US 6,360,625 B1
(45) Date of Patent: Mar. 26, 2002

(54) POWER TRANSMISSION APPARATUS AND VEHICLE USING POWER TRANSMISSION APPARATUS

(75) Inventors: Taizo Miyazaki, Hitachi; Toshimichi Minowa, Mito; Tomoyuki Hanyu, Hitachi; Ryoso Masaki, Hitachi; Yasuo Morooka, Hitachi, all of (JP)

(73) Assignee: Hitachi, Ltd., Tokyo (JP)

(*) Notice: Subject to any disclaimer, the term of this patent is extended or adjusted under 35 U.S.C. 154(b) by 0 days.

(21) Appl. No.: 09/538,272

(22) Filed: Mar. 30, 2000

(30) Foreign Application Priority Data

Jun. 2, 1999 (JP) .......................................... 11-155375

(51) Int. Cl.⁷ ............................ F16H 3/02; F16H 37/04
(52) U.S. Cl. ......................................... 74/348; 74/349
(58) Field of Search .................................... 74/348, 349

(56) References Cited

U.S. PATENT DOCUMENTS 1,817,819 A * 8/1931 Healey ........................ 74/348
2,025,763 A * 12/1935 Martin ..................... 74/349 X
5,660,077 A * 8/1997 Nekola ..................... 74/348 X

FOREIGN PATENT DOCUMENTS

| JP | 1-303358 | 12/1989 |
| JP | 7-127702 | 5/1995 |

* cited by examiner

*Primary Examiner*—Allan D. Herrmann
(74) *Attorney, Agent, or Firm*—Crowell & Moring LLP

(57) ABSTRACT

The invention provides a power transmission apparatus having a reduced power transmission loss. In the power transmission apparatus, an input shaft side variable pitch circle gear, an output shaft side variable pitch circle gear and a cycloid sliding gear which have a shape accumulated by a cycloid gear in which a pitch circle continuously changes are meshed with each other. The cycloid sliding gear slides and an engagement position thereof changes, thereby changing a radius of an engagement pitch circle of the gear so as to change a shift ratio.

11 Claims, 6 Drawing Sheets

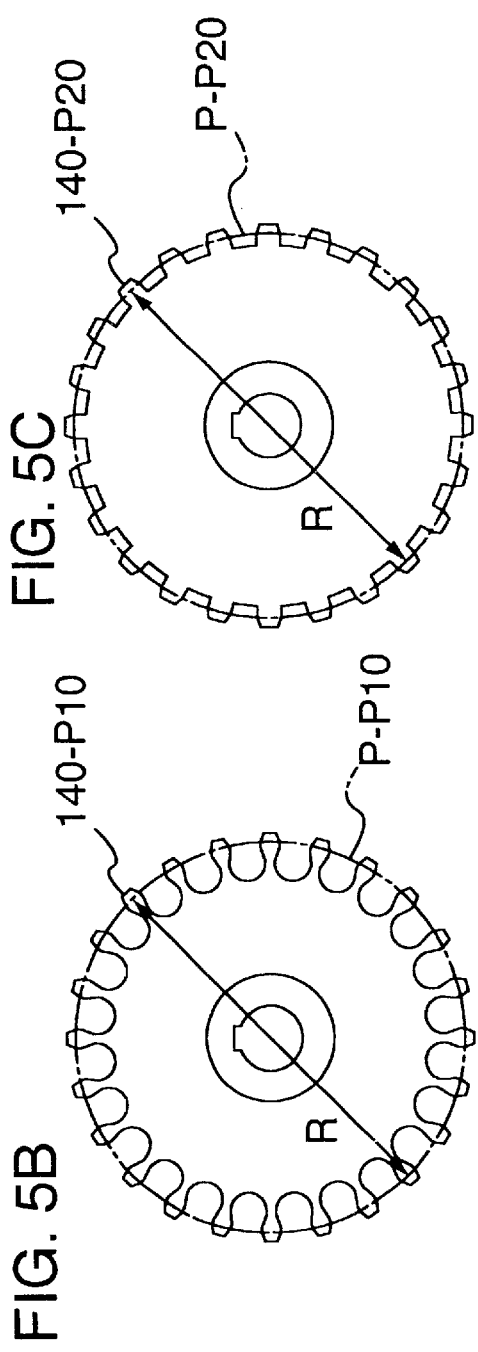
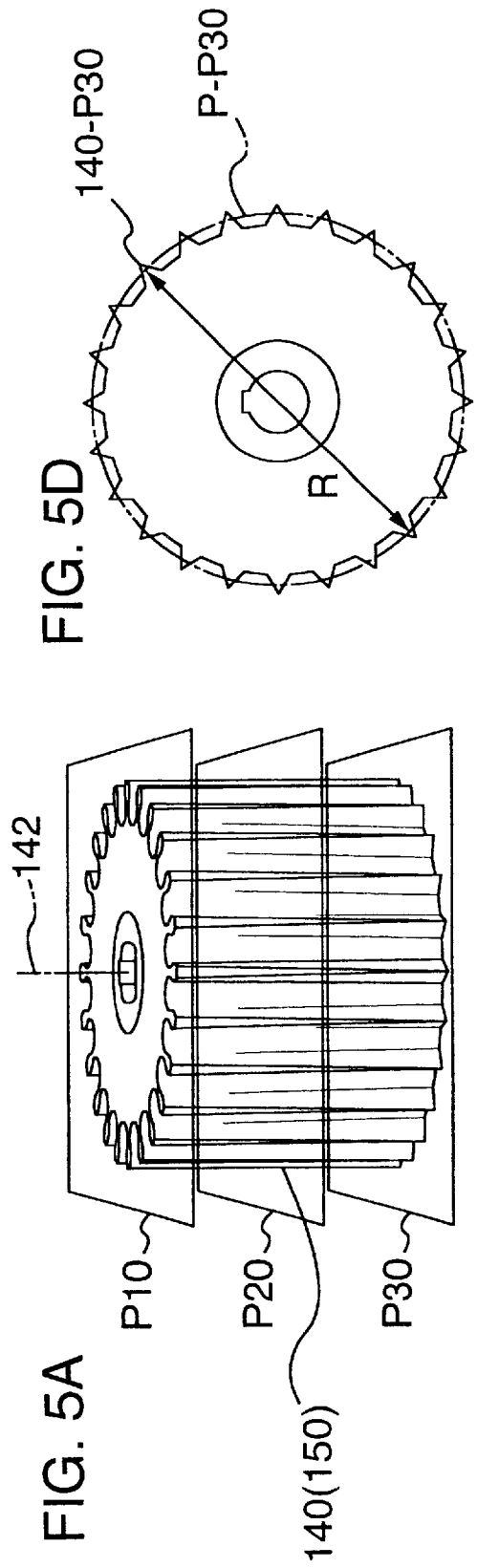
FIG. 5C
FIG. 5D
FIG. 5B
FIG. 5A

POWER TRANSMISSION APPARATUS AND VEHICLE USING POWER TRANSMISSION APPARATUS

BACKGROUND OF THE INVENTION

1. Field of the Invention

The present invention relates to a power transmission apparatus which can continuously change a ratio of a rotational speed and a vehicle which performs a variable speed travel with using the power transmission apparatus.

2. Description of the Prior Art

In a vehicle which employs an internal combustion engine as a main power source, since a wide variable speed travel is requested between a low speed travel at a starting time and a high speed travel, a speed change gear is employed for the power transmission apparatus. As a conventional speed change gear for a vehicle, there have been known a discontinuously variable transmission which replaces an engagement of a gear so as to change a shift ratio step by step., and a continuously variable transmission which can continuously change a shift ratio. Then, in view of a comfortable drive, the continuously variable transmission having no shift shock is desirable.

As the conventional continuously variable transmission, for example, there has been known a continuously variable transmission mechanism constituted by a plurality of conical rollers and connecting rollers arranged between respective conical rollers, as described in Japanese Patent Unexamined Publication No. 7-127702. Further, as another continuously variable transmission, for example, there has been known a gear type continuously variable transmission constructed by combining a conical helical gear and a relay gear, as described in Japanese Patent Unexamined Publication No. 1-303358. Further, a belt type continuously variable transmission has been also known.

However, for example, in the continuously variable transmission described in Japanese Patent Unexamined Publication No. 7-127702, a friction gear mechanism is employed as a base for transmitting a power, so that there is a problem that a power transmission loss is greater than the discontinuously variable transmission. Because in order to transmit a great torque, it is necessary to apply a great force in a direction perpendicular to a direction of transmitting the power for increasing a friction force, whereby a loss of a hydraulic mechanism for generating the force is increased.

Further, in the conventional belt type continuously variable transmission, since a friction loss is also generated due to a slip at a time when a belt is engaged and disengaged, there is a problem that a transmission loss is further increased.

On the contrary, in the gear type continuously variable transmission described in Japanese Patent Unexamined Publication No. 1-303358, since a helical gear is employed, a slip is always generated in a direction perpendicular to a direction of transmitting the torque during the operation, so that there is a problem that a friction loss is great.

As mentioned above, in the conventional continuously variable transmission, there has been a problem that the power transmission loss is great. Further, in the vehicle employing the conventional continuously variable transmission, since the power transmission loss is great in the continuously variable transmission, there has been a problem that a specific fuel consumption is deteriorated.

SUMMARY OF THE INVENTION

A first object of the present invention is to provide a power transmission apparatus having a reduced power transmission loss.

A second object of the present invention is to provide a vehicle having an improved specific fuel consumption.

In order to achieve the first object mentioned above, in accordance with the present invention, there is provided a power transmission apparatus comprising:

a first gear having a first rotational axis and a cross sectional shape which continuously changes along a direction of the rotational axis; and a second gear meshing with the first gear and having a thickness smaller than that of the first gear, wherein a radius of a pitch circle of one of the first gear and the second gear continuously change when the second gear slides with respect to the first gear while changing a position of engagement.

In accordance with the structure mentioned above, since the second gear slides with respect to the first gear, whereby the radius of the pitch circle continuously changes, it is possible to continuously change a shift ratio and reduce a power transmission loss.

In accordance with a second aspect of the present invention, there is provided a power transmission apparatus as recited in the first aspect, wherein in preferable, the first gear has a cross sectional shape in which a radius of the pitch circle continuously changes along the direction of the first rotational axis.

In accordance with a third aspect of the present invention, there is provided a power transmission apparatus as recited in the first aspect, wherein in preferable, the first gear has a cross sectional shape in which a pressure angle continuously changes along the direction of the first rotational axis.

In accordance with a fourth aspect of the present invention, there is provided a power transmission apparatus as recited in the first aspect, wherein in preferable, a cross sectional shape of the first gear is a cycloid tooth, the second gear has a cycloid tooth, a radius of an outer rolling circle forming the second gear is equal to a radius of an inner rolling circle of the first gear, and a radius of an inner rolling circle forming the second gear is equal to a radius of an outer rolling circle of the first gear.

In accordance with a fifth aspect of the present invention, there is provided a power transmission apparatus as recited in the first aspect, wherein in preferable, a cross sectional shape of the first gear is an involute tooth, the second gear has an involute tooth, and the first gear is structured such that a pressure angle continuously changes along the predetermined path.

In order to achieve the second object mentioned above, in accordance with the present invention, there is provided a vehicle having a power source, a power transmission for changing and transmitting a rotational power generated from the power source, and tire wheels driven by the rotational output shifted by the power transmission apparatus, the power transmission apparatus comprising:

a first gear having a first rotational axis and a cross sectional shape which continuously changes along a direction of the rotational axis; and a second gear meshing with the first gear and having a thickness smaller than that of the first gear, wherein a radius of a pitch circle of one of the first gear and the second gear continuously change when the second gear slides with respect to the first gear while changing a position of engagement.

In accordance with the structure mentioned above, it is possible to reduce a power transmission loss of the power transmission apparatus and improve a specific fuel consumption of the vehicle.

BRIEF DESCRIPTION OF THE DRAWINGS

FIG. 5A is a perspective view which shows a structure of an input shaft side variable pressure angle involute gear employed for the continuously variable transmission corresponding to the power transmission apparatus in accordance with the embodiment of the present invention;

FIGS. 5B–5D show cross-sectional shapes in three planes which are perpendicular to the input shaft of FIG. 5A;

DESCRIPTION OF THE PREFERRED EMBODIMENTS

Figure 1:
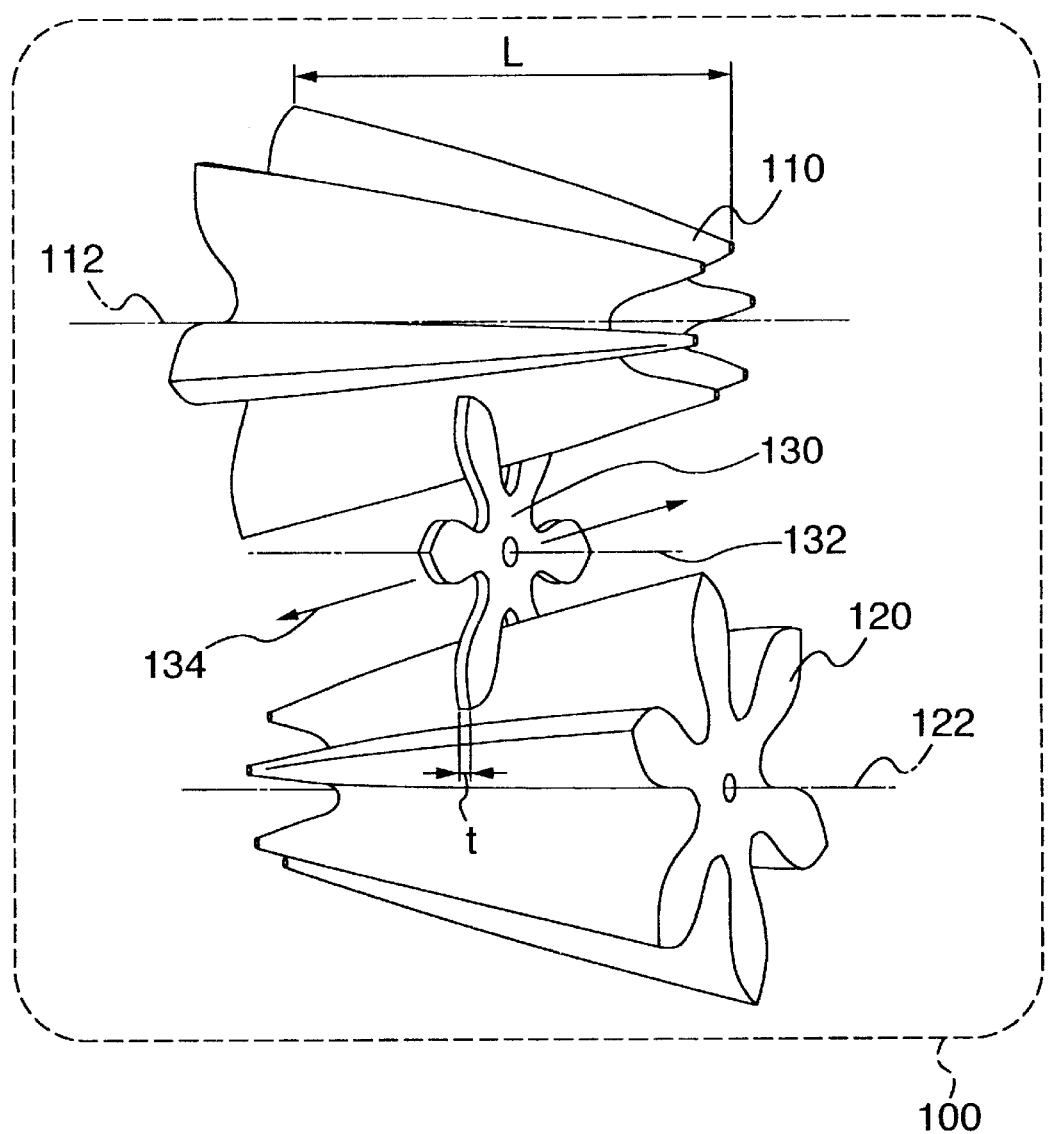
FIG. 1 is a perspective view which shows a structure of a continuously variable transmission corresponding to a power transmission apparatus in accordance with an embodiment of the present invention.

A description will be given below of a structure of a power transmission apparatus in accordance with an embodiment of the present invention with reference to FIGS. 1 and 2A–2E.

At first, a description will be given of a structure of a continuously variable transmission corresponding to a power transmission apparatus in accordance with the present embodiment with reference to FIG. 1.

A continuously variable transmission 100 in accordance with the present embodiment is constituted by an input shaft side variable pitch circle gear 110, an output shaft side variable pitch circle gear 120, and a cycloid sliding gear 130.

The input shaft side variable pitch circle gear 110 rotates around an input shaft 112 corresponding to a center of rotation. The input shaft 112 is mounted to a power generating source such as an engine or the like and a rotational power is supplied to the continuously variable transmission 100. The input shaft side variable pitch circle gear 110 has a shape in which a radius of a pitch circle continuously changes in a plane perpendicular to the input shaft 112, and in an illustrated embodiment, a radius of a pitch circle disposed in a left side in the drawing is set to be greater than a radius of a right pitch circle. In this case, the pitch circle indicates an equivalent radius when supposing the gear as a friction gear, and the details thereof will be described later with reference to FIGS. 2A–2E.

The output shaft side variable pitch circle gear 120 rotates around an output shaft 122 corresponding to a center of rotation. The output shaft 122 supplies a rotational output shifted by the continuously variable transmission 100 to a load side. Further, the output shaft 122 is in parallel to the input shaft 112. The output shaft side variable pitch circle gear 120 is a variable pitch circle gear having the same shape as that of the input shaft side variable pitch circle gear 110. In this case, the output shaft side variable pitch circle gear 120 is structured such that in the illustrated embodiment, a radius of a right pitch circle in the drawing is greater than a radius of a left pitch circle, so that a size of the radius of the pitch circle is structured in such a manner as to be inverse to that of the input shaft side variable pitch circle gear 110.

The cycloid sliding gear 130 is a cycloid gear which rotates around a sliding gear rotational axis 132 and can move in a direction of an arrow 134. The cycloid sliding gear 130 is arranged in such a manner as to be meshed with both of the input shaft side variable pitch circle gear 110 and the output shaft side variable pitch circle gear 120.

The cycloid sliding gear 130 moves along the moving direction 134, whereby an engaging position between the input shaft side variable pitch circle gear 110 and the output shaft side variable pitch circle gear 120 is changed, and the radii of the pitch circles in the input shaft side variable pitch circle gear 110 and the output shaft side variable pitch circle gear 120 continuously change. Accordingly, a number of rotation of the input shaft 112 and a number of rotation of the output shaft 122 continuously change, and a shift ratio of the continuously variable transmission 100 continuously changes.

In this case, in the illustrated embodiment, the sliding gear rotational axis 132 is arranged in parallel to the input shaft 112 and the output shaft 122, however, the power can be transmitted even when it is arranged in parallel to the direction of the arrow 134.

Next, a description will be given of the shapes of the input shaft side variable pitch circle gear 110 and the output shaft side variable pitch circle gear 120 which are employed for the continuously variable transmission 100 in accordance with the present embodiment with reference to FIGS. 2A–2E.

Figure 2:
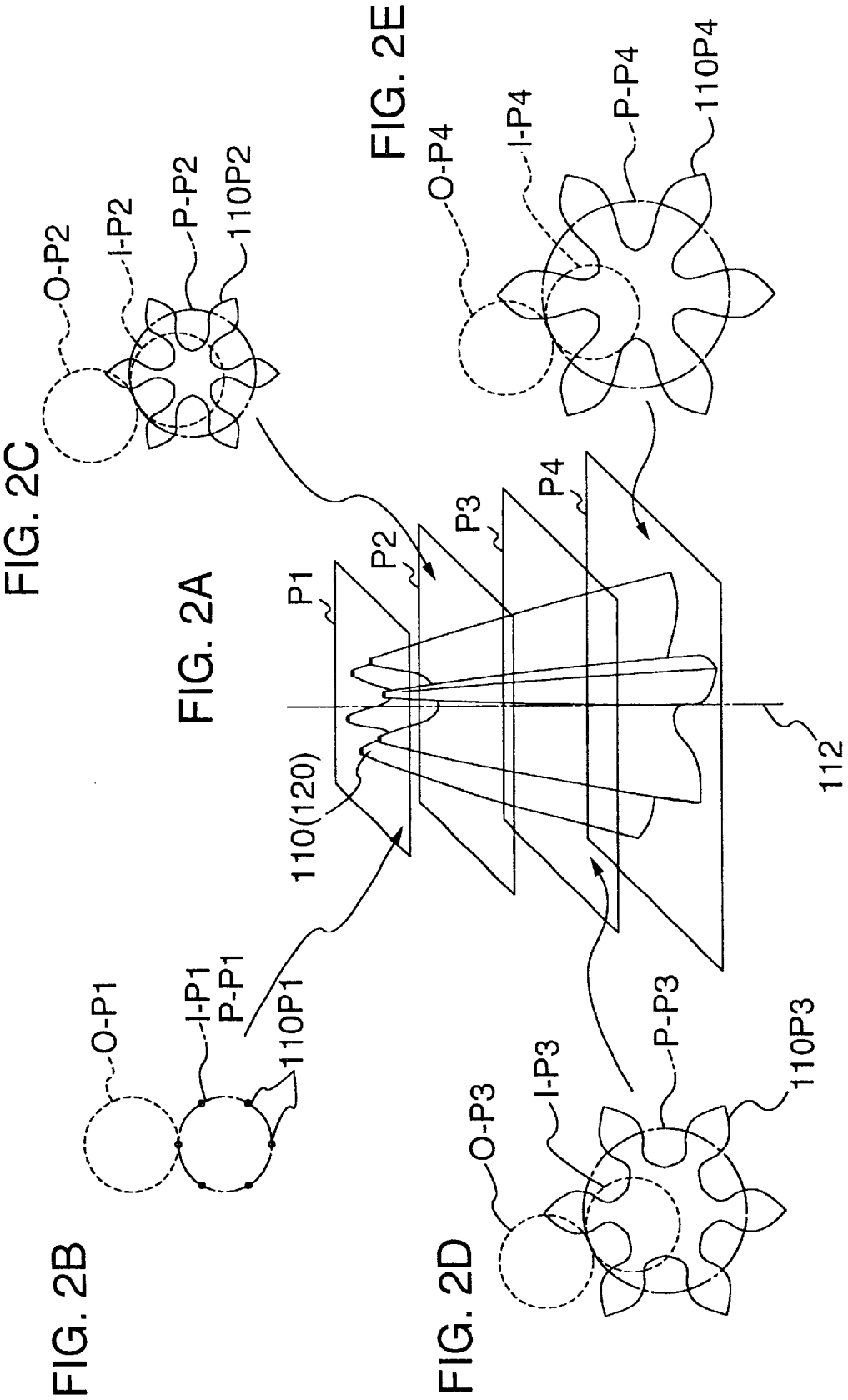
FIG. 2A is a perspective view which shows a structure of an input shaft side variable pitch circle gear employed for the continuously variable transmission corresponding to the power transmission apparatus in accordance with the embodiment of the present invention.
FIGS. 2B–2E show cross sectional shapes in four planes which are perpendicular to the input shaft side variable circle of FIG. 2A.

FIG. 2 is a schematic view which shows a shape of the variable pitch circle gear employed for the continuously variable transmission corresponding to the power transmission apparatus in accordance with an embodiment of the present invention.

FIG. 2A is a perspective view which shows the input shaft side variable pitch circle gear 110, and FIGS. 2B to 2E respectively show cross sectional shapes in four planes P1, P2, P3 and P4 which are perpendicular to the input shaft 112. In this case, since the input shaft side variable pitch circle gear 110 and the output shaft side variable pitch circle gear 120 have the same shape, the following description will be given only of the variable pitch circle gear 110. The plane P1 is a plane in one end portion in which the radius of the pitch circle of the variable pitch circle gear 110 is minimum. Further, the plane P4 is a plane in another end portion in which the radius of the pitch circle of the variable pitch circle gear 110 is maximum. The planes P2 and P3 are planes at respective positions separated into three sections between the planes P1 and P4 in the direction of the input shaft 112.

A cross sectional shape of the variable pitch circle gear 110 has a cycloid tooth. The cycloid tooth is formed by an epicycloid curve described by one point on an outer rolling circle which rolls outside the pitch circle, and a hypocycloid curve described by one point on an inner rolling circle which rolls inside the pitch circle.

That is, as shown in FIG. 2B, a cross sectional shape 110P1 of the variable pitch circle gear 110 in the plane P1 is formed as illustrated. At this time, when setting a radius of an outer rolling circle O-P1 in this cross sectional shape 110P1 to, for example, 45 mm, a radius of an inner rolling circle I-P1 is set to 45 mm which is equal to the radius of the outer rolling circle O-P1. Further, a radius of a pitch circle P-P1 is 45 mm.

Further, as shown in FIG. 2C, a cross sectional shape 110P2 of the variable pitch circle gear 110 in the plane P2 is formed as illustrated. At this time, a radius of an outer rolling circle O-P2 and a radius of an inner rolling circle I-P2 in this cross sectional shape 110P2 are set to 45 mm which is equal to the radius of the outer rolling circle O-P1 and the inner rolling circle I-P1 in the cross sectional shape 110P1. Further, a radius of a pitch circle P-P2 is 60 mm.

Further, as shown FIG. 2D, a cross sectional shape 110P3 of the variable pitch circle gear 110 in the plane P3 is formed as illustrated. At this time, a radius of an outer rolling circle O-P3 and a radius of an inner rolling circle I-P3 in the cross sectional shape 110P3 are set to 45 mm which is equal to the radius of the outer rolling circle O-P1 and the inner rolling circle I-P1 in the cross sectional shape 110P1. Further, a radius of a pitch circle P-P3 is 75 mm.

Further, as shown in FIG. 2E, a cross sectional shape 110P4 of the variable pitch circle gear 110 in the plane P4 is formed as illustrated. At this time, a radius of an outer rolling circle O-P4 and a radius of an inner rolling circle I-P4 in the cross sectional shape 110P4 are set to 45 mm which is equal to the radius of the outer rolling circle O-P1 and the inner rolling circle I-P1 in the cross sectional shape 110P1. Further, a radius of a pitch circle P-P4 is 90 mm.

That is, the variable pitch circle gear 110 in the present embodiment is structured such that the radius O of the outer rolling circle and the radius I of the inner rolling circle are equal to each other and the variable pitch circle gear is formed by accumulating the cycloid tooth in which the pitch circle continuously changes.

On the contrary, the cycloid sliding gear 130 shown in FIG. 1 is structured such that the radius of the outer rolling circle and the radius of the inner rolling circle are set to 45 mm which is equal to the radius O of the variable pitch circle gear 110 and the radius I of the inner rolling circle.

Both elements can be engaged with each other at a fixed rotational speed ratio by making the radius O of the outer rolling circle of the variable pitch circle gear 110 equal to the radius of the inner rolling circle of the cycloid gear 130 which is meshed with the variable pitch circle gear 110. Accordingly, when accumulating the cycloid tooth in which the radius of the rolling circle is uniform and the pitch circle continuously changes so as to form the variable pitch circle gear 110, it is possible to engage with the sliding gear 130 at every positions. In the structure shown in FIG. 1, since the pitch circle of the variable pitch circle gears 110 and 120 continuously changes in accordance with the meshing position, and the pitch circle of the sliding gear 130 does not change, it is possible to continuously change the shift ratio.

In the structure shown in FIG. 1, when the sliding gear 130 is positioned in a right side in FIG. 1, the radius of the pitch circle of the input shaft side variable pitch circle gear 110 is 45 mm, the radius of the pitch circle of the sliding gear 130 is 45 mm and the radius of the pitch circle of the output shaft side variable pitch circle gear 120 is 90 mm, so that a shift ratio between the input shaft 112 and the output shaft 122 is 0.5. Further, when the sliding gear 130 is positioned in a left side in FIG. 1, the radius of the pitch circle of the input shaft side variable pitch circle gear 110 is 90 mm, the radius of the pitch circle of the sliding gear 130 is 45 mm and the radius of the pitch circle of the output shaft side variable pitch circle gear 120 is 45 mm, so that a shift ratio between the input shaft 112 and the output shaft 122 is 2.0. That is, in the continuously variable transmission employing the variable pitch circle gears 110 and 120 shown in FIG. 1, it is possible to obtain a continuous shift ratio between 0.5 and 2.0.

In this case, in FIGS. 2A–2E, in the variable pitch circle gear 110, a number of teeth is set to 6 and the radius of the pitch circle is changed within a range between 45 mm and 90 mm, however, a changing range of the number of the teeth and the radius of the pitch circle can be optionally set as far as the conditions of the radius of the rolling circle mentioned above are satisfied. In this case, it is intended to make the continuously variable transmission compact by restricting the pressure angle to a range between 0 and 30 degrees and reducing the number of the teeth.

Further, in the structure shown in FIG. 1, two variable pitch circle gears 110 and 120 and the sliding gear 130 are employed, however, for example, it is possible to constitute the continuously variable transmission by the variable pitch circle gear 110 and the sliding gear 130.

As mentioned above, the continuously variable transmission in which the shift ratio continuously changes is constituted by employing the variable pitch circle gear 110 and the sliding gear 130 by accumulating the cycloid tooth in which the radius of the rolling circle is uniform and the pitch circle continuously changes. In this case, as shown in FIG. 1, a thickness t of the sliding gear 130 is set to be smaller than a thickness L of the variable pitch circle gears 110 and 120. Accordingly, as shown in Japanese Patent Unexamined Publication No. 1-303358, since a smaller slip is generated in comparison with the case that all the area of the conical helical gear is structured in such a manner as to be meshed with all the area of the relay gear, it is possible to reduce a friction loss, so that it is possible to reduce the power transmission loss.

Next, a description will be given of a structure of a power transmission apparatus in accordance with another embodiment of the present invention with reference to FIGS. 3, 4, and 5A–5D.

At first, a description will be given of a structure of a continuously variable transmission corresponding to the power transmission apparatus in accordance with the present embodiment with reference to FIG. 3.

In the embodiment mentioned above, the continuously variable transmission is constituted by using the cycloid gear in which the pitch circle continuously changes, however, in the present embodiment, the continuously variable transmission in which changes the pitch circle is as a result constituted by using the involute tooth and continuously changing the engagement pressure angle.

A continuously variable transmission 100A in accordance with the present embodiment is constituted by an input shaft side variable pressure angle involute gear 140, an output shaft side variable pressure angle involute gear 150, and an involute sliding gear 160.

The input shaft side variable pressure angel involute gear 140 rotates around an input shaft 142 corresponding to a center of rotation. The input shaft 142 is mounted to a power generating source such as an engine or the like and a rotational power is supplied to the continuously variable transmission 10A. The input shaft side variable pressure angle involute gear 140 has a shape in which a pressure angle continuously changes in a plane perpendicular to the input shaft 142. In this case, the radii of the pitch circles P-P10 and P-P30 are equal to each other. In this case, it is possible to change the radius of the pitch circle itself, however, here, a description will be given of an embodiment in which a radius of the pitch circle of the engaged gear is changed by changing the pressure angle. In the illustrated embodiment, the pitch circle P-P10 shows a pitch circle in which a pressure angle is 10 degrees, the pitch circle P-P30 shows a pitch circle in which the pressure angle is 30 degrees, and both are equivalent. The relation between the pressure angle and the pitch circle of the engaged gear is in detail described later with reference to FIGS. 4 and 5.

The output shaft side variable pressure angle involute gear 150 rotates around an output shaft 152 corresponding to a center of rotation. The output shaft 152 supplies a rotational output shifted by the continuously variable transmission 100A to a load side. Further, the output shaft 152 is in parallel to the input shaft 142. The output shaft side variable pressure angle involute gear 150 is a variable pressure angle gear having the same shape as that of the input shaft side variable pressure angle involute gear 140.

The involute sliding gear 160 is an involute gear which rotates around a sliding gear rotational axis 162 and can move in a direction of an arrow 164. The involute sliding gear 160 is arranged in such a manner as to be meshed with both of the input shaft side variable pressure angle involute gear 140 and the output shaft side variable pressure angle involute gear 150.

The involute sliding gear 160 moves along the moving direction 164, whereby an engaging position between the input shaft side variable pressure angle involute gear 140 and the output shaft side variable pressure angle involute gear 150 is changed, and the radius of the pitch circle in the involute sliding gear 160 continuously change. Accordingly, a number of rotation of the input shaft 142 and a number of rotation of the output shaft 152 continuously change, and a shift ratio of the continuously variable transmission 100A continuously changes.

In this case, in the illustrated embodiment, the sliding gear rotational axis 162 is arranged in parallel to the input shaft 142 and the output shaft 152, however, the power can be transmitted even when it is arranged in parallel to the direction of the arrow 164.

Next, a description will be given of the shapes of the involute sliding gear 160 which is employed for the continuously variable transmission 100A in accordance with the present embodiment with reference to FIG. 4.

Figure 3:
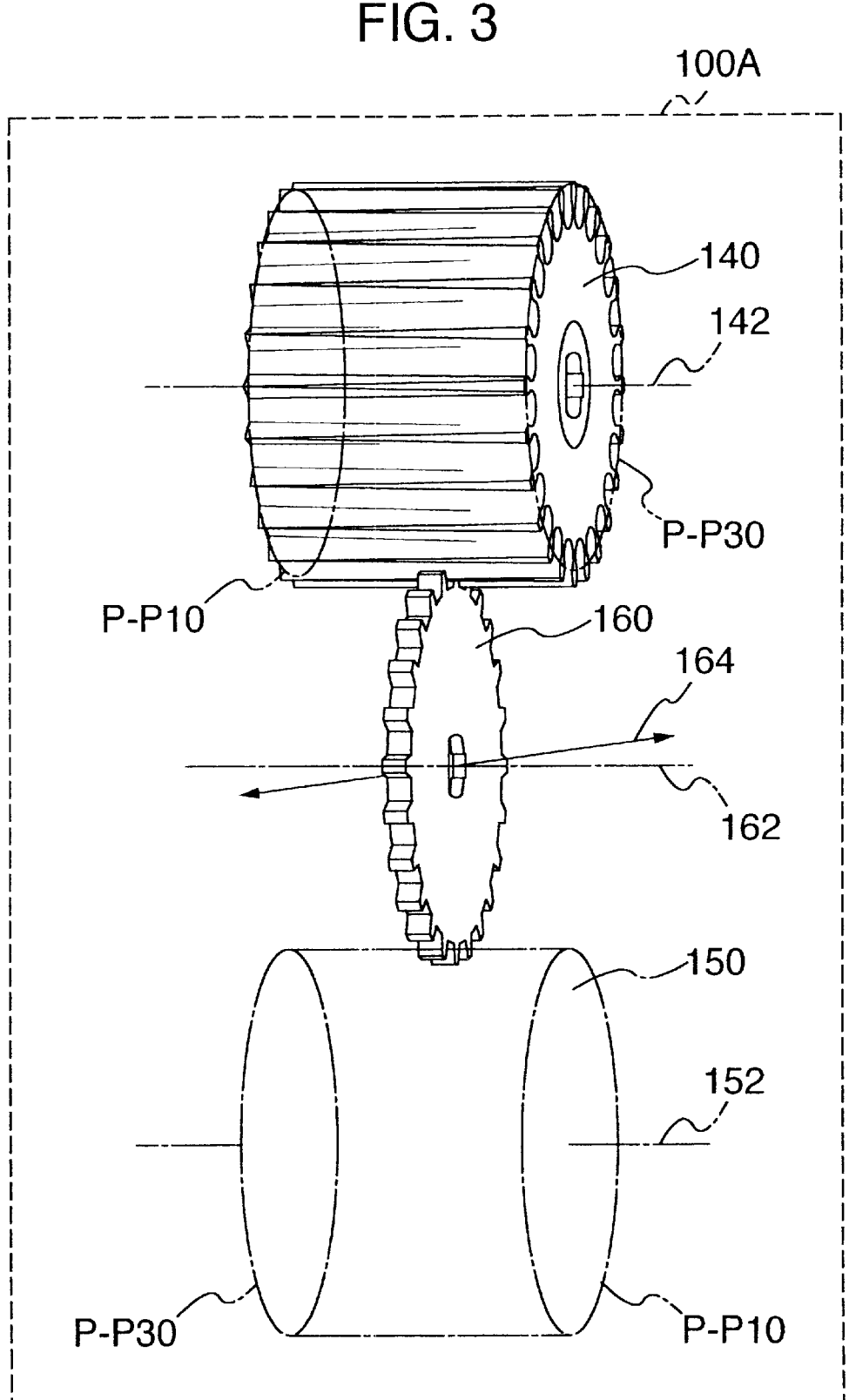
FIG. 3 is a perspective view which shows a structure of a continuously variable transmission corresponding to a power transmission apparatus in accordance with another embodiment of the present invention.
Figure 4:
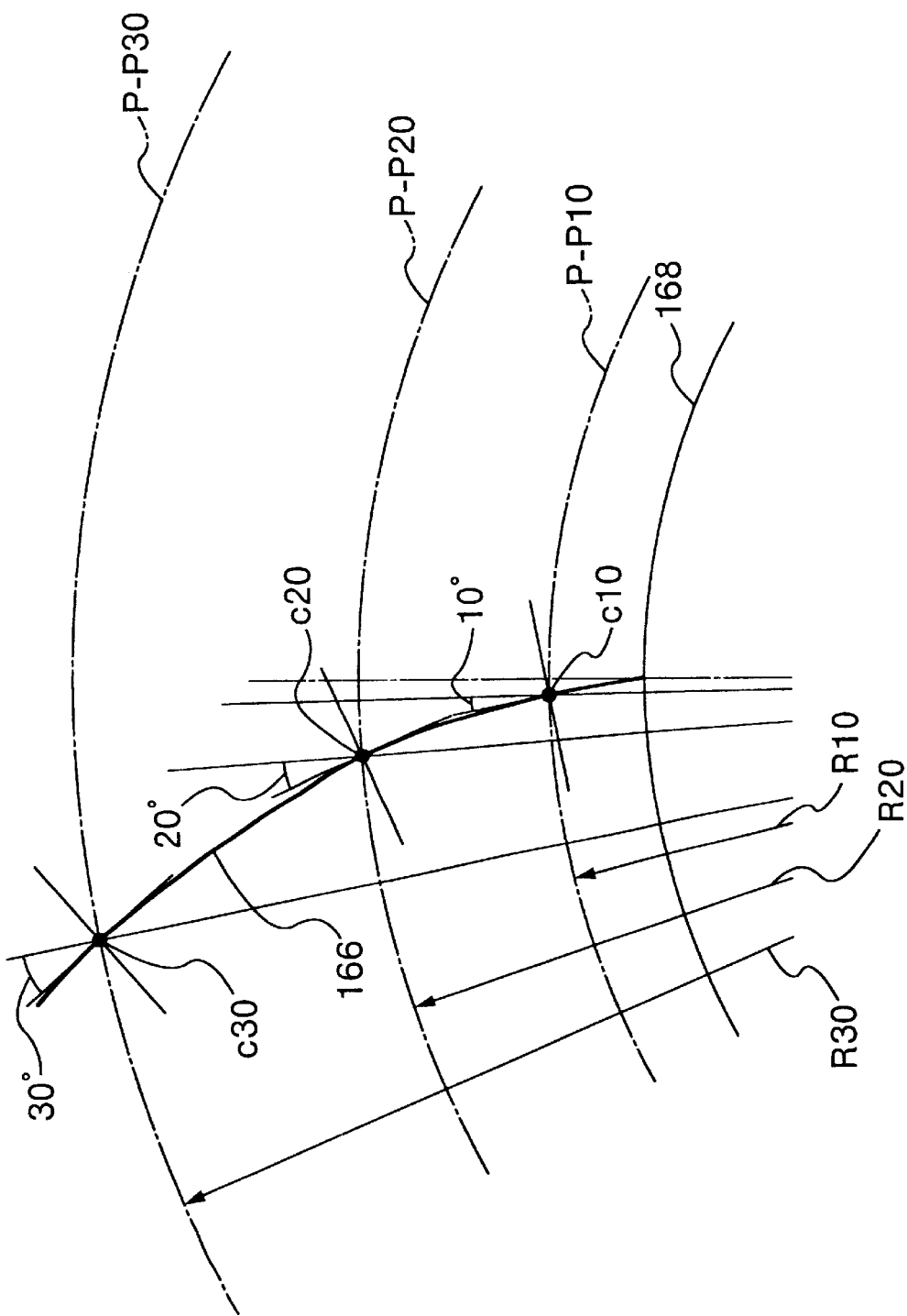
FIG. 4 is a schematic view which shows a shape of an involute sliding gear employed for the continuously variable transmission in accordance with another embodiment a of the present invention.

FIG. 4 shows a part of the involute sliding gear 160 shown in FIG. 3 in an enlarged manner, and shows a part of the involute tooth 166 and a basic circle 168. In this case, FIG. 4 is illustrated in a locally large scale for the purpose of explanation, and is not illustrated in a right scale.

In general, in the involute gear, the pressure angle is defined by a position of a contact point. In FIG. 4, when a contact point of the involute tooth 166 is set to c10, the engagement pressure angle becomes 10 degrees, when the contact point is set to c20, the engagement pressure angle becomes 20 degrees and when the contact point is set to c30, the engagement pressure angle becomes 30 degrees.

The contact point in the involute gear shown in FIG. 4 is defined by the pressure angle in the pitch circle of the engaged gear. For example, in the case that the gear designed to be engaged at the pressure angle 10 degrees is meshed with the involute tooth 166 shown in FIG. 4, the pitch circle of the involute sliding gear 160 becomes P-P10 and the radius of the pitch circle becomes R10. In the same manner, when engaging the gear designed to be meshed at the pressure angle of 20 degrees, the pitch circle becomes P-P20 and the radius of the pitch circle becomes R20, and when engaging the gear designed to be meshed at the pressure angle of 30 degrees, the pitch circle becomes P-P30 and the radius of the pitch circle becomes R30. That is, it is possible to change the pitch circle without changing the shape of the involute sliding gear itself shown in FIG. 4 by combining the gear designed to be meshed at the different pressure angle.

Next, a description will be given of a shape of the input shaft side variable pressure angle involute gear 140 and the output shaft side variable pressure angle involute gear 150 which are employed for the continuously variable transmission 100 in accordance with the present invention, with reference to FIGS. 5A–5D.

FIG. 5A is a perspective view which shows the input shaft side variable pressure angle involute gear 140, and FIGS. 5B to 5D respectively show cross sectional shapes in three planes P10, P20 and P30 which are perpendicular to the input shaft 142. In this case, since the input shaft side variable pressure angle involute gear 140 and the output shaft side variable pressure angle involute gear 150 have the same shape, the following description will be given only of the variable pressure angle involute gear 140. The plane P10 is a plane in one end portion of the variable pressure angle involute gear 140. Further, the plane P30 is a plane in another end portion of the variable pressure angle involute gear 140. The plane P20 is a plane at an intermediate position between the planes P10 and P30.

All of cross sectional shapes of the variable pressure angle involute gears 140 have a radius of the same pitch circle, however, designed pressure angles in the pitch circles are respectively different from each other.

That is, as shown in FIG. 5B, a cross sectional shape 140P10 of the variable pressure angle involute gear 140 in the plane P10 is formed in a tooth shape having the pressure angle of 10 degrees as illustrated. At this time, a radius of the pitch circle P-P10 in the cross sectional shape 140P10 is R. In this case, an undercut due to a tooth interference is generated at the pressure angle of 10degrees, however, this is generated because the variable pressure angle gear 140 and the involute sliding gear 160 are meshed with each other in deep.

Further, as shown in FIG. 5C, a cross sectional shape 140P20 of the variable pressure angle involute gear 140 in the plane P20 is formed in a tooth shape having the pressure angle of 20 degrees as illustrated, which is different from the cross sectional shape 140P10. At this time, a radius of the pitch circle P-P20 is R which is the same as that of the pitch circle P-P10.

Further, as shown in FIG. 5D, a cross sectional shape 140P30 of the variable pressure angle involute gear 140 in the plane P30 is formed in a tooth shape having the pressure angle of 30 degrees as illustrated, which is different from the cross sectional shape 140P10. At this time, a radius of the pitch circle P-P30 is R which is the same as that of the pitch circle P-P10.

That is, the variable pressure angle involute gear 140 in accordance with the present embodiment is formed by accumulating the involute tooth in which the radius of the pitch circle is uniform and the pressure angle continuously changes.

In the structure shown in FIG. 3, when the sliding gear 160 is positioned in a right side in FIG. 3, the radius of the pitch circle of the siding gear 160 with respect to the input shaft side variable pressure angle involute gear 140 is R30, and the radius of the pitch circle of the sliding gear 160 with respect to the output shaft side variable pressure angle involute gear 150 is R10, so that a shift ratio between the input shaft 142 and the output shaft 152 is R10/R30. Further, when the sliding gear 160 is positioned in a left side in FIG. 3, the radius of the pitch circle of the sliding gear 160 with respect to the input shaft side variable pressure angle involute gear 140 is R10 and the radius of the pitch circle of the sliding gear 160 with respect to the output shaft side variable angle involute gear 150 is R30, so that a shift ratio between the input shaft 142 and the output shaft 152 is R30/R10. That is, in the continuously variable transmission employing the variable pressure angle involute gears 140 and 150 and the sliding gear 160 shown in FIG. 3, it is possible to obtain a continuous shift ratio between R10/R30 and R30/R10, and the value is for example between 0.88 and 1.13.

In this case, it is easy to change the pitch circle even in the variable pressure angle gear, and it is possible to increase the shift range.

Further, in the structure shown in FIG. 3, two variable pressure angle involute gears 140 and 150 and the sliding gear 160 are employed, however, for example, it is possible to constitute the continuously variable transmission by the variable pressure angle involute gear 140 and the sliding gear 160.

As mentioned above, the continuously variable transmission in which the shift ratio continuously changes is constituted by employing the variable pressure angle involute gears 140 and 150 and the sliding gear 160 by accumulating the involute tooth in which the radius of the pitch circle is uniform and the pressure angle continuously changes. In this case, as shown in FIG. 3, a thickness of the sliding gear 160 is set to be smaller than a thickness of the variable pressure angle involute gears 140 and 150. Accordingly, as shown in Japanese Patent Unexamined Publication No. 1-303358, since a smaller slip is generated in comparison with the case that all the area of the conical helical gear is structured in such a manner as to be meshed with all the area of the relay gear, it is possible to reduce a friction loss, so that it is possible to reduce the power transmission loss.

As mentioned above, in accordance with the present invention, it is possible to reduce the power transmission loss in the power transmission apparatus.

In this case, in the description mentioned above, the cycloid gear is employed for the variable pitch circle gear, however, it is possible to employ the involute gear.

Further, in the variable pressure angle gear, it is possible to constitute the tooth shape in such a manner as to not only continuously change the pressure angle but also continuously change the radius of the pitch circle.

Next, a description will be given of a structure of a vehicle which employs the power transmission apparatus 100 or 100A in accordance with the embodiment shown in FIGS. 1 to 5 with reference to FIG. 6.

Figure 6:
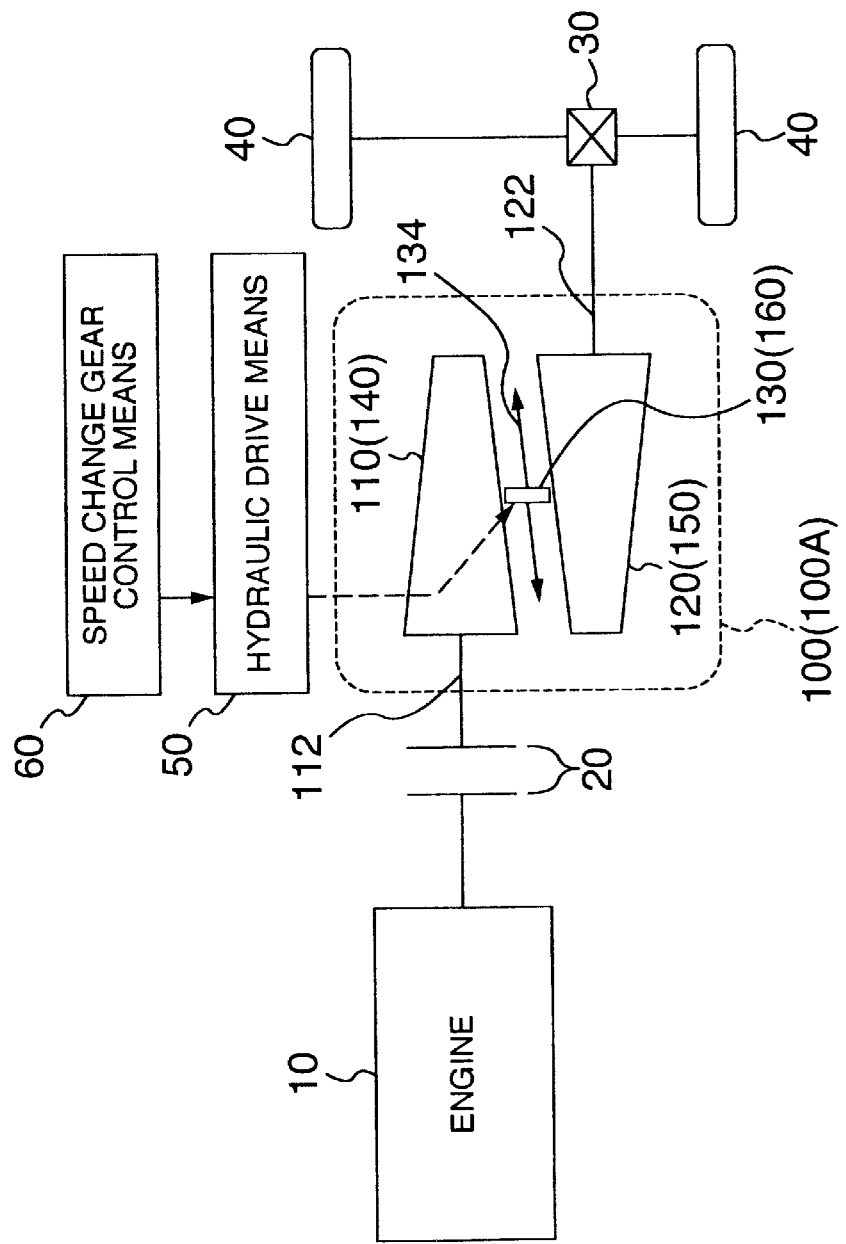
FIG. 6 is a block diagram which shows a structure of a vehicle employing the power transmission apparatus in each of the embodiments in accordance with the present invention.

FIG. 6 is a block diagram which shows a structure of the vehicle which employs the power transmission apparatus in each of the embodiments in accordance with the present invention.

A rotational power generated by s power generating source 10 such as an engine or the like is transmitted to the input shaft 112 of the continuously variable apparatus 100 via engaging and disengaging means 20 such as a clutch or the like. The continuously variable transmission 100 is constituted by the input shaft side variable pitch circle gear 110, the output shaft side variable pitch circle gear 120 and the sliding gear 130, as shown in FIGS. 1 and 2. It is possible to change the shift ratio in the continuously variable transmission 100 by sliding the sliding gear 130 in the direction of the arrow 134. The sliding gear 130 is slid in the direction of an arrow 134 by hydraulic drive means 50 in a direction of an arrow 134.

Speed change gear control means 60 calculates an optimum shift ratio on the basis of information of the vehicle such as a pedaling amount of an accelerator pedal (not shown), a vehicle speed and the like, outputs a control signal to the hydraulic drive means 50, controls a position of the sliding gear 130 and controls a shift ratio.

The output shaft 122 of the continuously variable transmission 100 is connected to tire wheels 40 via differential means 30 and supplies a rotational output shifted by the continuously variable transmission 100 to the tire wheels 40.

In this case, it is possible to employ a continuously variable transmission 100A described with reference to FIGS. 3 to 5 in place of the continuously variable transmission 100.

As mentioned above, in accordance with the present embodiment, since it is possible to reduce a power transmission loss in the power transmission apparatus, it is possible to improve a specific fuel consumption of the vehicle which employs the continuously variable transmission.

In accordance with the present invention, it is possible to reduce a power transmission loss in the power transmission apparatus.

Further, it is possible to improve a specific fuel consumption of the vehicle which employs the continuously variable transmission.

What is claimed is:

1. A power transmission apparatus comprising:
   a first gear having a first rotational axis and a cross sectional shape which continuously changes along a direction of the rotational axis; and
   a second gear meshing with the first gear and having a thickness smaller than that of said first gear,
   wherein a radius of a pitch circle of one of said first gear and said second gear continuously change when said second gear slides with respect to said first gear while changing a position of engagement; and
   wherein said first gear has a cross sectional shape in which a pressure angle continuously changes along the direction of said first rotational axis.

2. A power transmission apparatus as claimed in claim 1, wherein said first gear has a cross sectional shape in which a radius of the pitch circle continuously changes along the direction of said first rotational axis.

3. A power transmission apparatus as claimed in claim 1, wherein a cross sectional shape of said first gear is a cycloid tooth, said second gear has a cycloid tooth, a radius of an outer rolling circle forming said second gear is equal to a radius of an inner rolling circle of said first gear, and a radius of an inner rolling circle forming said second gear is equal to a radius of an outer rolling circle of said first gear.

4. A power transmission apparatus as claimed in claim 1, wherein a cross sectional shape of said first gear is an involute tooth, said second gear has an involute tooth, and said first gear is structured such that a pressure angle continuously changes along said predetermined path.

5. A vehicle having a power source, a power transmission for changing and transmitting a rotational power generated from the power source, and tire wheels driven by the rotational output shifted by the power transmission apparatus, said power transmission apparatus comprising:

a first gear having a first rotational axis and a cross sectional shape which continuously changes along a direction of the rotational axis; and a second gear meshing with the first gear and having a thickness smaller than that of said first gear, wherein a radius of pitch circle of one of said first gear and said second gear continuously change when said second gear slides with respect to said first gear while changing a position of engagement; and wherein said first gear has a cross sectional shape in which a pressure angle continuously changes along the direction of said first rotational axis.

6. A power transmission apparatus comprising:

a first gear having a first rotational axis and a cross sectional shape which continuously changes along a direction of the rotational axis; and a second gear meshing with the first gear and having a thickness smaller than that of said first gear, wherein a radius of a pitch circle of one of said first gear and said second gear continuously change when said second gear slides with respect to said first gear while changing a position of engagement; and wherein a cross sectional shape of said first gear is a cycloid tooth, said second gear has a cycloid tooth, a radius of an outer rolling circle forming said second gear is equal to a radius of an inner rolling circle of said first gear, and a radius of an inner rolling circle forming said second gear is equal to a radius of an outer rolling circle of said first gear.

7. A power transmission apparatus as claimed in claim 6, wherein said first gear has a cross sectional shape in which a radius of the pitch circle continuously changes along the direction of said first rotational axis.

8. A power transmission apparatus comprising:

a first gear having a first rotational axis and a cross sectional shape which continuously changes along a direction of the rotational axis; and a second gear meshing with the first gear and having a thickness smaller than that of said first gear, wherein a radius of a pitch circle of one of said first gear and said second gear continuously change when said second gear slides with respect to said first gear while changing a position of engagement; and wherein a cross sectional shape of said first gear is an involute tooth, said second gear has an involute tooth, and said first gear is structured such that a pressure angle continuously changes along said predetermined path.

9. A power transmission apparatus as claimed in claim 8, wherein said first gear has a cross sectional shape in which a radius of the pitch circle continuously changes along the direction of said first rotational axis.

10. A vehicle having a power source, a power transmission for changing and transmitting a rotational power generated from the power source, and tire wheels driven by the rotational output shifted by the power transmission apparatus, said power transmission apparatus comprising:

a first gear having a first rotational axis and a cross sectional shape which continuously changes along a direction of the rotational axis; and a second gear meshing with the first gear and having a thickness smaller than that of said first gear, wherein a radius of a pitch circle of one of said first gear and said second gear continuously change when said second gear slides with respect to said first gear while changing a position of engagement; and wherein a cross sectional shape of said first gear is a cycloid tooth, said second gear has a cycloid tooth, a radius of an outer rolling circle forming said second gear is equal to a radius of an inner rolling circle of said first gear, and a radius of an inner rolling circle forming said second gear is equal to a radius of an outer rolling circle of said first gear.

11. A vehicle having a power source, a power transmission for changing and transmitting a rotational power generated from the power source, and tire wheels driven by the rotational output shifted by the power transmission apparatus, said power transmission apparatus comprising:

a first gear having a first rotational axis and a cross sectional shape which continuously changes along a direction of the rotational axis; and a second gear meshing with the first gear and having a thickness smaller than that of said first gear, wherein a radius of a pitch circle of one of said first gear and said second gear continuously change when said second gear slides with respect to said first gear while changing a position of engagement; and wherein a cross sectional shape of said first gear is an involute tooth, said second gear has an involute tooth, and said first gear is structured such that a pressure angle continuously changes along said predetermined path.

* * * * *